Sept. 19, 1950          G. D. ALVORD          2,523,179
WEIGHT CHECKING SAMPLER
Filed Jan. 3, 1947
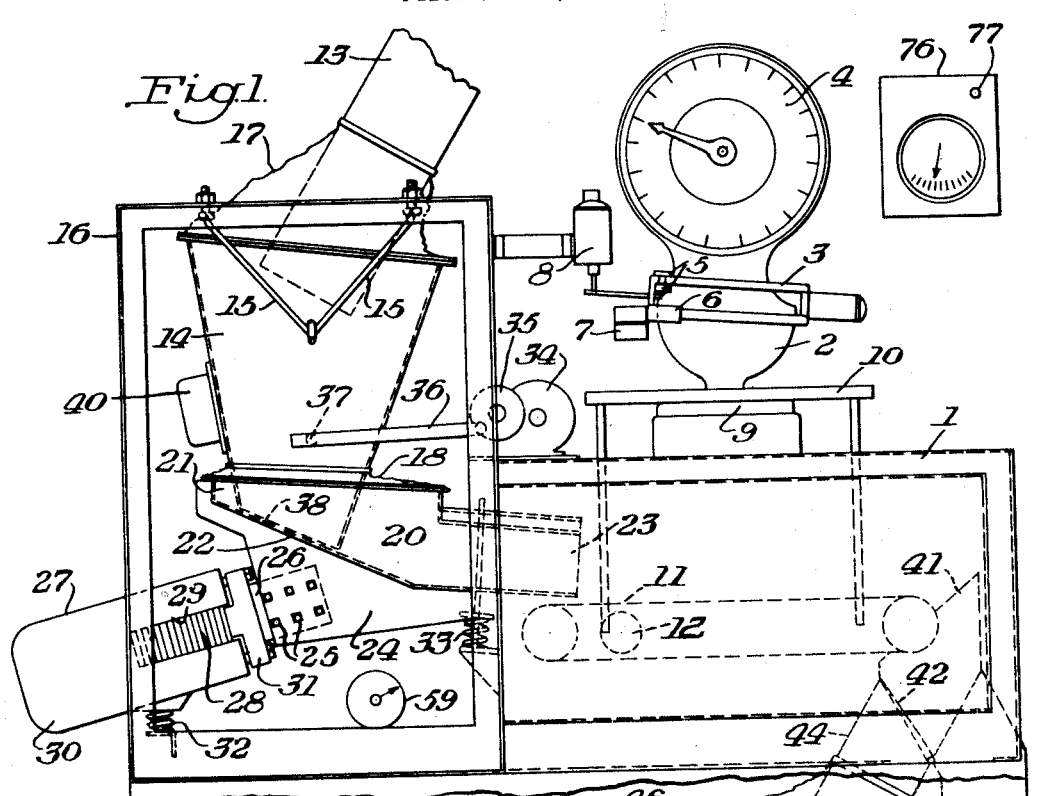
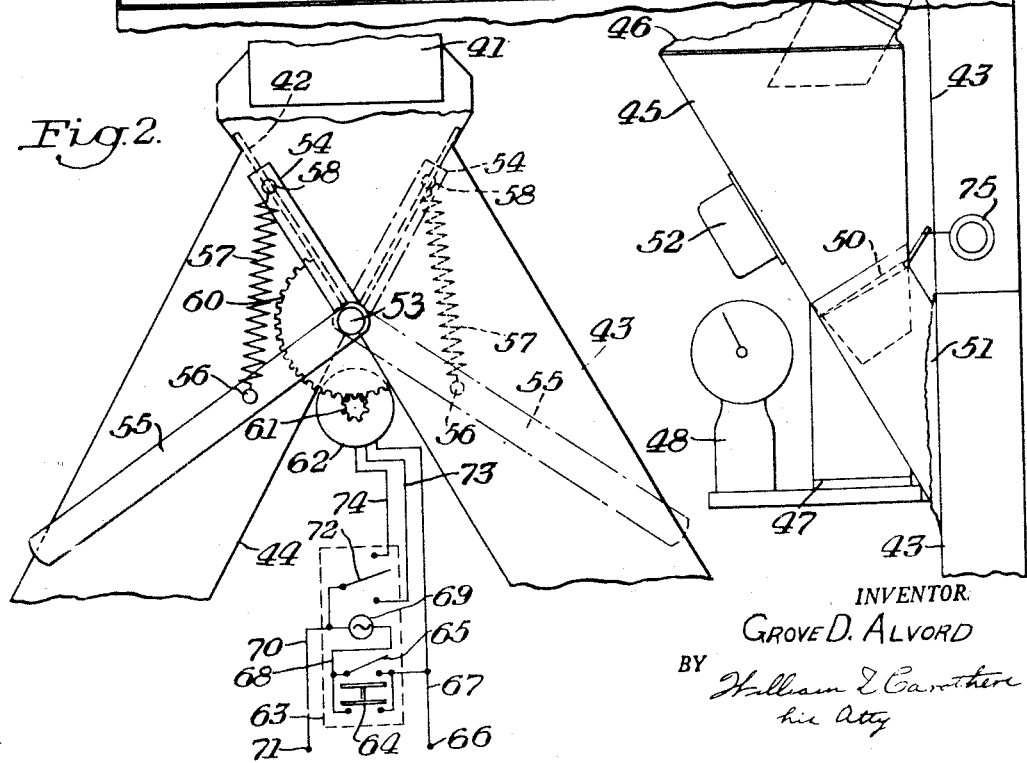
INVENTOR.
GROVE D. ALVORD
BY William E. Carruthers
his Atty Patented Sept. 19, 1950

2,523,179

UNITED STATES PATENT OFFICE 2,523,179

WEIGHT CHECKING SAMPLER

Grove D. Alvord, Indiana, Pa., assignor to Syntron Company, Homer City, Pa., a corporation of Delaware Application January 3, 1947, Serial No. 720,044

3 Claims. (Cl. 73—1)

This invention relates generally to the control of continuously flowing materials and more particularly to apparatus for checking the amount by weight of a continuously flowing material by extracting and measuring a sample of the material being supplied with minimum disturbance to the feed.

The principal object of this invention is the provision of apparatus for extracting a sample and weighing the same for the purpose of checking the delivery of continuously flowing material.

Another object is the provision of apparatus for checking the delivery of a gravimetric feeder after the material or its delivery rate has been changed.

Another object is the provision of apparatus for removing a sample from a continuous flow of a poisonous or obnoxious material to check the rate of delivery of a gravimetric feeder without manually handling the same.

Another object is the provision for automatically removing a sample from a volumetric feeder to check its rate of continuous flow.

Another object is the provision for automatically removing a sample from a continuous flow of material to check the rate of flow and return the checked sample to the normal course of the material.

Another object is the provision of apparatus for determining the rate of flow factor of a continuous gravimetric feeder and for periodically checking this factor.

Other objects and advantages appear hereinafter in the following description and claims.

A practical embodiment illustrating the principles of this invention is shown in the accompanying drawing wherein:

Fig. 1 is a view in elevation of a gravimetric feeder in a weight sampler comprising this invention.

Fig. 2 is a diagrammatic view illustrating a snap-acting flap valve employed to direct material to the sampler.

Referring to the drawings, the gravimetric feeder is enclosed in the base frame 1 which is arranged to support the platform scale 2 having a beam arm 3 and the dial scale 4. The beam 3 is arranged to carry the usual counterpoise 5 and 6 to correct the tare weight and is also arranged to actuate switch 7 and the transmitter 8 for controlling the supply to the gravimetric feeder. The scale platform 9 is arranged to support the hanger structure 10 on which is suspended the synchronous conveyor belt mechanism 11. This conveyor is operated by a synchronous motor illustrated at 12 and is arranged to drive the endless conveyor belt 11 at a uniform speed.

The material to be measured and fed is received by chute 13 from a bin or other supply which directs the material to the hopper 14 suspended by the slings 15 attached to the frame 16 which is adjacent and secured to the frame 1. A flexible dust hood 17 is arranged to encircle the chute 13 and the top of the hopper 14 for the purpose of preventing material or the dust created thereby from escaping as it is transferred from the chute to the hopper. The hopper 14 in turn is provided with a flexible dust hood 18 which is connected at its lower end to the enclosed conveyor trough 20. The conveyor trough 20 is provided with an enlarged receiving end 21 having a sloping bottom 22 and a tubular trough section 23 which is arranged to deliver the material directly on the center of the synchronous conveyor belt 11. The conveyor trough 20 is also provided with a pair of wing plates 24 which are welded to the trough and are secured by the bolts 25 to the armature supporting member 26 of the vibratory motor 27. The armature supporting member 26 is in turn bolted to the intermediate section of the leaf springs 28, the ends of which are clamped in the slots 29 of the frame 30 by the clamping bars 31. A vibratory motor of this character is disclosed in United States Letters Patent 2,356,961 and does not per se form a part of this invention. The motor 27 and the trough 20 are supported by the coil springs 32 and 33. The weight of the conveyor trough 20 is materially less than the weight of the motor structure 27 to prevent the latter from absorbing any of the vibratory action delivered to the former.

A control motor 34 is mounted on the frame 1 and is arranged to operate the crank arm 35 to which one end of the bifurcated pitman 36 is pivotally attached. The other ends of the pitman are pivotally attached at 37 to the gudgeons on the opposite sides of the hopper 14. Owing to the fact that the hopper is supported in the slings 15 it is permitted to be swung back and forth by means of the crank 35 operating through the pitman 36. The discharge mouth 38 of the hopper 14 has the same slope as the bottom 22 of the conveyor trough 20 and when the crank 35 swings the hopper 14 to its extreme position to the left the mouth 38 is closely adjacent the sloping floor 22 thereby acting as a valve to prevent the flow of material from the hopper 14 to the conveyor trough 20. However the mouth 38 of the hopper is not close enough to engage the floor 22 of the conveyor trough when the latter is being vibrated but it is sufficiently close to prevent the flow of the material from the hopper to the trough.

A vibrator 40 is attached to the side of the hopper and is arranged to vibrate the material in the hopper and maintain a uniform flow therefrom.

The discharge end of the synchronous conveyor belt 11 is arranged to deposit the material into the chute 41. This chute is provided with a Y connection having a snap-acting flap valve 42 which is shown in Fig. 1 in the position to direct the material down the chute 43 to a bin or container into which the measured material is delivered for use. If the valve 42 is operated to move it in the position shown in Fig. 2 the material is deflected into the chute 44 where it is deposited into the hopper 45. The dust hood 46 is arranged to connect the hopper 45 to the chute 44 to prevent the escape of any dust therefrom. The hopper 45 is in turn supported on the weighing platform 47 of the scale 48. The hopper 45 is provided with a gate member 50 which when opened permits the material in the hopper 45 to be discharged back into the chute 43. A flexible hood connection 51 is made between the mouth of the hopper and the chute 43 to prevent the escape of material or dust from this connection.

52 is a vibrator attached to the hopper 45 for vibrating the material to provide uniform flow thereof when the gate 50 is opened. This vibrator functions to completely discharge the hopper 45 and thus prevent false indication upon checking the next sample taken from the feeder. The scale 48 may be of a graphic type which will record the weight of each sample taken from the delivery of the gravimetric feeder. After the reading has been taken or recorded from the scale 48 the gate 50 may be opened to discharge the material from the hopper 45 to the chute 43.

As shown in Fig. 2, the flap valve 42 may be secured to the shaft 53 journaled in the Y connection of the chutes 43 and 44 and extending through one wall and has the valve arm 54 fixed thereto. A manual operating lever 55 is journaled on the shaft 53 and is provided with a lug 56 arranged to hold one end of the coil spring 57, the other end being attached to the lug 58 on the valve arm 54. Thus when the operating lever 55 is swung to a position beyond the plane of the valve 42 and its valve arm 54, the spring 57 will cause the latter to snap to the opposite position. A valve of this character provides a uniform speed of the movement of the valve which materially aids in obtaining consistent results in checking the output weight of the gravimetric feeder by sample.

The chute 41 of the weight checking sampler shown in Fig. 2 may be supplied directly from the chute 13 when disposed vertically or from the conveyor 20. In either event the apparatus supplying the material is provided with a controller such as the resistor 59 which when adjusted to different positions regulates the rate of flow of material from the trough 20. When employed with a gravimetric feeder as shown in Fig. 1, the transmitter 8 is arranged to vary the rheostat 59 to speed up or slow down the operation of the vibratory conveyor 20 to automatically maintain a constant load on the conveyor belt 11 as shown and described in Patent 2,429,864.

To provide an automatic weight checking sampler the manual operating lever 55 is equipped with the gear segment 60 arranged to mesh with the pinion 61 of the reversible servomotor 62. This servomotor may be energized by the push button timer 63 arranged when started by the push button 64 to close a holding circuit through the switch 65 that maintains the timer energized until after it has functioned to operate a completed cycle.

As shown in Fig. 2, the valve 42 is set to direct the material from any desired feeder or supply source, such as the vibratory feeder 20 or the gravimetric feeder shown in Fig. 1, to the chute 43. Upon depressing the push button 64 current flows from the source of electrical current supply 66 through the line 67, the push button 64, the line 68, the timer motor 69, and returns through the line 70 to the other side of the electric current supply 71. The timer motor first closes the switch 65 to establish the holding circuit from line 67 to line 68 to maintain the timer motor 69 energized for the complete cycle. The timer motor then functions to close the switch 72 to complete a circuit through the servomotor 62, current flowing from line 67 through the servomotor 62, and return through line 73, switch 72, line 70 to the return current supply 71. The servomotor is thus energized to swing the lever 55 to the right to throw the valve 42 in the same direction and direct the flow of material to the chute 44.

After a predetermined length of time, the timer motor 69 moves the switch 72 to connect the line 74 with the line 70 to reverse the servomotor 62 causing the valve to assume the position shown in Fig. 2 and redirect the flow of material to the chute 44. The sample of material has thus been taken from the stream and the material is again directed through the chute 43.

After the sample has been weighed or its weight recorded the valve 50 is operated to slowly meter the material from the hopper 45 to the chute 43 to prevent the sample from unduly swelling the stream of material. The valve 50 may also be operated by a servomotor 75 and both servomotors 62 and 75 are provided with check circuit switches that prevent the operation of one until the operation of the other has been completed.

The sample of material being withdrawn for a predetermined period of time thus provides an actual recording of the flow of material per unit of time which is employed to establish a flow factor for the material passing through the chute 43 regardless of whether it comes from the chute 13 when disposed vertically, the feeder 20 or the conveyor 11 of the gravimetric feeder as shown in Fig. 1. The sample weighed in the hopper 45 provides the weight of material per unit of time. When this weight is divided by the time required in taking the sample and the setting of the controller feeding, the chute 41 provides a calibration, which is the flow factor employed for regulating the setting of the conveyor controller to determine the desired amount of material continuously discharged to the chute 43. The factor thus obtained, multiplied by the scale reading 4 provides the weight of material fed by the gravimetric feeder per unit of time.

If it is desired to change the rate of flow of material fed by the gravimetric feeder the rate indicator controller 76 is adjusted by the rate setting knob 77 to a position, the value of which is obtained by dividing the weight of the sample times the desired rate of flow by the time required to take the sample and the setting of the control 76 when the sample was taken. The control may then be reset to this new position to cause the feeder to supply the material at the new desired rate. The rate indicating controller 76 is also disclosed in Patent 2,429,864.

If the vibratory feeder 20 is supplying the chute 41 directly, the factor of the rate of flow of material is determined by dividing the weight of the sample by the time required to take it and the setting of the control rheostat 59. The sample provides the weight of material per unit of time. When it is desired to change the rate of flow the desired rate of feed times the weight of the sample divided by the setting of the control 59 and time for taking the sample, provides the adjustment of the controller 59 in terms of its setting to provide the new rate of flow.

Upon installing, cleaning, or changing the rate of flow of gravimetric feeders of this character, it is preferable to establish a flow factor by which the dial or scale setting is multiplied to provide the weight per unit of time of the flow of material. This factor may change with a change in the character or grade of material, a change in the tare weight of the feeder when cleaned, or other factors contributing to the operation of the machine. Any large change in the rate of flow of some materials may not produce a straight line function of the machine which would necessitate a check of the flow of material.

I claim:

1. Apparatus for checking the delivery of the continuous flowing granular material from a feeder supplying a stream of granular material at a substantially uniform rate, comprising a chute mounted to receive the whole of the stream of granular material from the feeder and having a Y-connection to provide alternate branches extending therefrom, a biased valve mounted in said Y-connection to control the flow of the stream of the granular material to a selected branch, a hopper connected to receive the whole of the stream from one of said branches and supported on a weighing machine, and a control discharge valve on said hopper constructed to return the granular material at a selected rate of flow from the hopper to said other branch.

2. Apparatus for checking delivery of continuous flowing granular material from a feeder supplying a stream of granular material at a substantially uniform rate, comprising a chute mounted to receive the whole of the stream of granular material from the feeder and having a Y-connection to provide alternate branches extending therefrom, a biased valve mounted in the Y-connection to control the flow of the stream of granular material to a selected branch, a hopper connected to receive the whole of the stream from one of said branches and supported on a weighing machine, independent motor means to flop said valve and divert the whole of the stream to the branch directed to said hopper for a given length of time to check the rate of flow of material delivered by the feeder, and valve means to return the granular material from the hopper to said other branch.

3. Apparatus for checking the delivery of the continuous flowing granular material from a feeder supplying a stream of granular material at a substantially uniform rate, comprising a chute mounted to receive the whole of the stream of granular material from the feeder and having alternate branches extending therefrom, a biased valve mounted to control the flow of the stream of the granular material to a selected branch, a hopper connected to receive the whole of the stream from one of said branches and supported on a weighing machine, and a control discharge valve on said hopper constructed to return the granular material at a selected rate of flow from the hopper to said other branch.

GROVE D. ALVORD.

REFERENCES CITED

The following references are of record in the file of this patent:

UNITED STATES PATENTS

| Number | Name | Date |
|---|---|---|
| 1,777,670 | Hausman | Oct. 7, 1930 |
| 1,996,189 | Biro | Apr. 2, 1935 |
| 2,238,758 | Thornhill | Apr. 15, 1941 |
| 2,327,367 | Nowak, Jr. | Aug. 24, 1943 |

FOREIGN PATENTS

| Number | Country | Date |
|---|---|---|
| 489,555 | Germany | July 28, 1938 |